United States Patent [19]
Winchester

[11] 3,787,279
[45] Jan. 22, 1974

[54] SHOCK AND FIRE ATTENUATING FUEL TANK

[75] Inventor: Henry F. Winchester, Cerritos, Calif.

[73] Assignee: The United States of America as represented by the Secretary of the Navy, Washington, D.C.

[22] Filed: May 22, 1972

[21] Appl. No.: 255,369

[52] U.S. Cl. ............... 161/160, 161/161, 161/404, 161/405, 220/63 A, 244/135 R, 244/135 B
[51] Int. Cl. ............................................. B32b 5/04
[58] Field of Search ........... 161/160, 161, 404, 405; 220/63 A; 244/135 R, 135 B

[56] References Cited
UNITED STATES PATENTS

| | | | |
|---|---|---|---|
| 3,322,868 | 5/1967 | Kruse et al. | 161/190 UX |
| 3,506,224 | 4/1970 | Harr et al. | 161/405 UX |
| 3,509,016 | 8/1970 | Underwood et al. | 161/405 |
| 3,575,786 | 4/1971 | Baker et al. | 161/404 |
| 3,561,639 | 2/1971 | Allen | 161/190 UX |
| 3,567,536 | 3/1971 | Wickersham, Jr. | 161/160 |

Primary Examiner—William J. Van Balen
Attorney, Agent, or Firm—R. S. Sciascia; G. J. Rubens; J. W. McLaren

[57] ABSTRACT

A self-sealing fuel tank subject to penetration by projectiles that is improved with the addition of a layer of rigid, fiber-reinforced foam material attached contiguous to the outside wall surface of the fuel tank to enhance the resealing of the punctured tank wall and to reduce the vulnerability of fires external and internal to the tank, and further improved by the application of a layer of a similar foam material as a liner inside the tank to reduce damage caused by hydraulic ram pressure effects.

2 Claims, 5 Drawing Figures

SHOCK AND FIRE ATTENUATING FUEL TANK

BACKGROUND OF THE INVENTION

This invention relates to fuel tank construction, designed primarily for military aircraft to minimize the damage caused by projectiles from enemy gunfire.

Fuel tanks in military aircraft presents one of the most vulnerable components that can cause the disabling and/or destruction of the plane. This condition is particularly prevalent in low-flying operations where the aircraft is subject to gunfire from enemy ground troops using either hand guns or fixed installation weapons. In-flight fires are by far the most frequently reported casualties being observed in some 60-70 percent of the combat losses on which reports are available. Aircraft fuel tanks hit by projectiles or shrapnel may be subjected to one or more of several casualties, such as loss of fuel; fire or explosion outside the punctured fuel tank in the surrounding structural cavity; explosion and resulting fire inside a partially filled fuel tank; and rupture of aircraft structure and fuel tank due to the transmission of the bullet kinetic energy in the form of hydraulic ram pressure which creates destructive shock waves.

Self-sealing tanks are standard equipment in military aircraft and will seal, for the most part, puncturing by small caliber ammunition. The materials utilized in self-sealing tanks include numerous types of solid and cellular rubber layers, and various combinations of these materials. To be effective, however, the rubber type tank wall must be fully supported by a backing board, foam layers, etc. so that the wound remains in a uniform plane to allow the sealing material to close the hole. Punctures by large caliber projectiles are not effectively sealed, causing one or more of the aforementioned casualties. In addition, conventional self-sealing tanks can not cope with the fire threat posed by the use of armor-piercing incendiary projectiles. In effect, the existing self-sealing tanks are designed only to seal small openings, and their design did not account for the other damaging effects that projectiles may have on the tank and surrounding structure, especially by larger caliber projectiles, to which the present invention addresses.

SUMMARY OF THE INVENTION

Extensive experimental research performed for the purpose of reducing the fuel fire vulnerability of combat aircraft has disclosed a number of different effects caused by the penetration of a fuel tank by a projectile or fragment thereof. One of these effects is referred to as hydraulic pressure or ram effects. Pressure pulses caused by the penetration of 0.50 caliber and larger projectiles in liquid fuel tanks, approach pressures of 17,000 PSI. These shock waves may cause a fuel tank rupture that results not only in loss of fuel, but also damage to the aircraft structure to such an extent that normal flight loads cannot be sustained.

In accordance with the teaching of this invention shock wave damage can be substantially attenuated and absorbed by use of a liner adhered to or otherwise secured to the inside surfaces of the tank wall. The liner is composed of a crushable, rigid foam material, preferably polyurethane, reinforced with fibers, i.e., nylon, along three mutually perpendicular axes. It has been found to be effective in shock attenuation that the liner thickness should be at least one-eighth inch in thickness, and the material have a density of between 1.5 to 3 lbs/ft$^3$. The foam material is of a rigid type substantially composed of closed cells to be unaffected by absorption of the liquid fuel and to be uncompressed by the weight of the contained fuel in the tank.

Another serious effect relates to both internal and external fires caused by penetration of the self-sealing fuel tank by an armor piercing incendiary projectile. Internal fires occur under certain temperature conditions in the tank ullage, whereas external fires may occur in the cavities between the fuel tank and the aircraft skin. In accordance with the teaching of this invention a layer of the aforementioned foam material is positioned in the cavity contiguous to the outside tank wall surface. As distinguished from the use of the foam material as a tank liner where thickness is somewhat critical in that any excess reduces the volumetric contents of the tank, the thickness of the foam material when used as a panel on the outside of the fuel tank is not critical and will depend on the dimensions of the cavity. In this employment, the foam panels should preferably bear against the outside tank wall for support thereof and to keep the self-sealing material in the tank wall aligned to permit the resealing process. A unique result observed in the use of the tri-axially reinforced foam is that the reinforcing fibers function to wipe off much of the incendiary material on the projectile as it passes through the foam before it penetrates the tank. This wiping action reduces the tendency of the incendiary to cauterize the self-sealing material around the puncture. In addition, the ends of the severed fibers in the foam contribute to the resealing of the opening in the self-sealing wall. Thus, the tri-axially reinforced foam material not only assists in eliminating cavity fires but it enhances the resealing of the tank without loss of fuel.

OBJECTS OF THE INVENTION

A principal object of this invention is to improve the design of aircraft fuel tanks to reduce their vulnerability to fire and structural damage.

Another important object is to provide a fuel tank construction that will suppress the explosive effects and attenuate the shock caused by penetration.

Still another object is to minimize fuel loss and the effects of fuel fires both inside and outside the tank.

Other objects, advantages and novel features of the invention will become apparent from the following detailed description of the invention when considered in conjunction with the accompanying drawings.

DESCRIPTION OF THE PREFERRED EMBODIMENT

Figure 1:
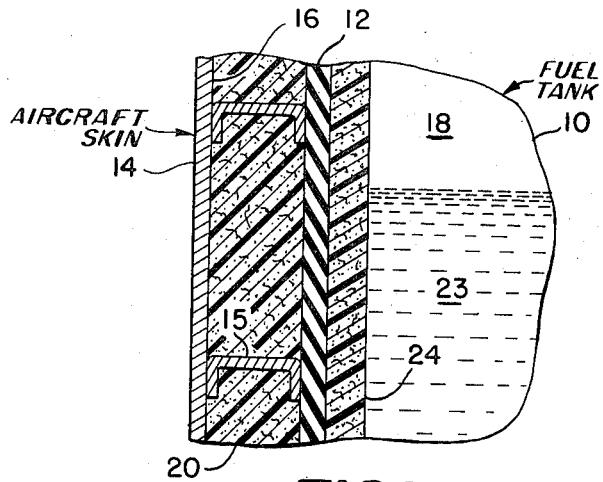
FIG. 1 is a partial cross-section of a conventional self-sealing fuel tank with the novel shock and fire attenuating panels attached to the inside and outside tank walls.

Referring to the drawings where like reference numerals refer to similar parts throughout the figures there is shown in FIG. 1 a conventional fuel tank 10 which can be either a fuselage or wing type tank, having self-sealing characteristics or not. However, it has been standard practice in the construction of military aircraft subject to gunfire to utilize fuselage type fuel tanks having self-sealing walls to protect the tank from destruction and loss of fuel, this type being specifically illustrated in FIGS. 1 and 2.

Various self-sealing fuel tank constructions have been proposed, the single thickness tank wall 12 being intended to be generally representative of all such types. In most instances, self-sealing walls are composed of a soft resilient material, i.e., rubber which when penetrated by the projectile or fragment thereof tends resiliently to move laterally to fill up the puncture and prevent loss of the liquid.

While standard self-sealing rubber tanks generally have proven to be satisfactory under most operating conditions in handling smaller caliber projectiles, elaborate tests have disclosed that the use of larger caliber ammunition can punch a larger opening in the tank than the self-sealing material can accommodate. Extensive tests have disclosed the existence of a variety of special problems when an armor piercing incendiary (API) bullet strikes the aircraft when the incendiary material is activated. A portion of the burning incendiary material is deposited on the aircraft skin 14, ribs 15 in the cavity 16 between the skin and tank wall 12, around the punctured opening in the tank wall, and is ultimately carried into the tank interior. It has been found that the burning incendiary material has a tendency to cauterize the bullet opening in tank wall which prevents the resealing process. As a result, leakage of the fuel seeps or sprays into cavity 16, and, under certain temperature conditions, can cause serious fires external to the tank.

Another fire problem can be propagated inside the tank by the burning incendiary material, especially if the bullet should traverse the ullage space 18, and conditions push the fuel/air ratio into the flammable region.

One of the principle purposes of the invention is to enhance the resealing properties of the self-sealing material of the fuel tanks to prevent fuel leakage that contributes to external fires, and the propagation of internal fires. These objectives have been accomplished by inserting a tri-axially reinforced foam material 20 of the type described in U.S. Pat. No. 3,322,868 between fuel tank wall 12 and the aircraft structure or skin 14 as shown in FIG. 1. As described in this patent the foam material, such as polyurethane is provided with reinforcing fibers, such as nylon threads. These fibers are disposed within the foam along mutually perpendicular axes to form a tri-axial fiber arrangement. The cellular structure of the patented foam is such as to be classified as a "rigid" foam having over 90 percent closed cells, as distinguished from "flexible" foam material which contains in the order of 90 percent open cells. The density of the patented material is in the order of 1.5 to 3 lbs./ft$^3$, and therefore it has low permeability to liquids and vapors. It was originally designed as a high-strength insulation material in rocket tanks containing cryogenic materials. Results of tests show when this foam material is used as an external backing for the rubber tank wall 12 that the fibers in the material perform the unexpected function of wiping off the incendiary material on the API bullets as it passes through the foam, thereby reducing the cauterizing action of the incendiary on the self-sealing rubber material around the bullet opening.

Figure 2:
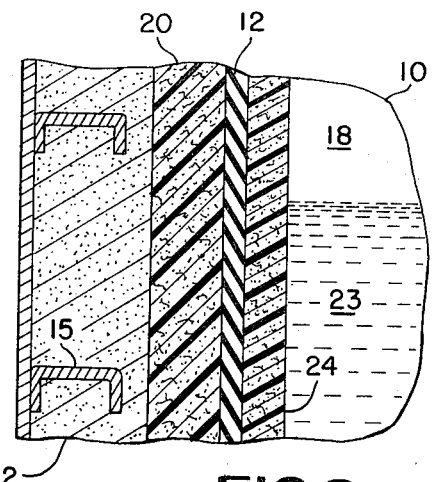
FIG. 2 is a modified construction of FIG. 1.

In addition, it has been discovered that the severed reinforcing fibers actually protrude into and bridge the opening thereby enhancing the resealing ability of the tank wall. The reinforced rigid foam material suffers from minimal coring and fracturing by the passage of the bullet as compared to other materials tested. An additional function of the tri-axially reinforcing foam material when used in aircraft structural cavities is to provide support for the tank wall to keep the self-sealing material in the tank wall aligned so that it can perform its resealing task much like the conventional backing board presently used with self-sealing fuel tanks. The thickness of foam material 20 for this use is not critical and depends on the space available, however, it should fit in snugly to bear against and support the tank wall. Accordingly, the rigid foam material can be installed in any cavity by cutting pieces slightly oversize and placing them between the frames under a slight compression and/or adhesively secured in position. Where a relatively large aircraft cavity exists as shown in FIG. 2, an additional layer of a filler material 22, which can be any other flexible type foam, can be used as a backing for the reinforced foam material 20, but it is important that the latter be placed contiguous with the tank wall if it is to perform its functions in the manner heretofore described.

In addition to the threat of external and internal fires caused, particularly by API bullets, experiments have revealed catastrophic explosive damage to the fuel tank and adjacent aircraft structure the causes of which heretofore may not have been fully appreciated. These effects can generally be referred to as hydraulic pressure effects. It has been found that the entering bullet initially causes extremely high amplitude pressure waves in the fuel 23 in the tank which shock waves travel at supersonic velocities with fast rise times. The extent of the pressure and time for a conical shaped bullet entering a fuel tank based on conducted experiments can be seen in the graph of FIG. 3.

Figure 3:
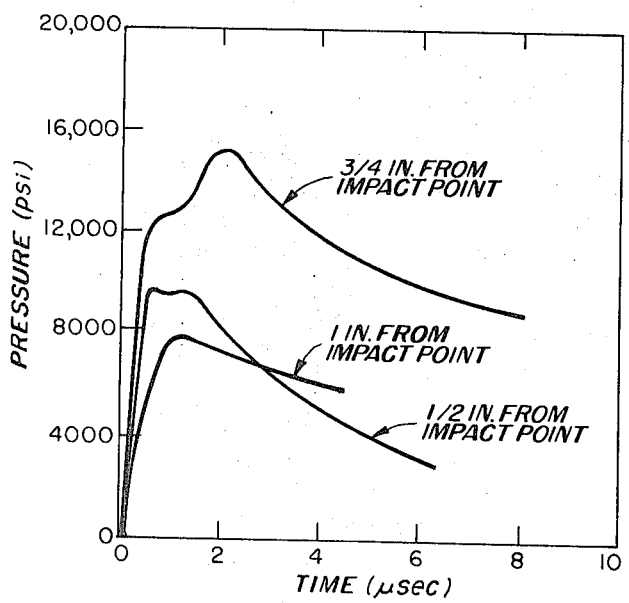
FIG. 3 is a graph showing the measured pressure-time profile generated by entry of a conical-nosed projectile in a fuel tank.

As the projectile nose engages the liquid fuel it displaces the fluid by compression. The localized high pressure causes a shock wave to move radially outward from the impact point into the fuel. As can be seen in FIG. 3, the initial shock wave pressure decays rapidly with distance from the impact point and, in general, is too weak to causy any damage when it reaches the lateral and rear walls of the tank (not shown). However, the very high pressures, although of micro-second duration, are capable of transferring considerable outward momentum to the tank walls near the impact point. As a result of the aforementioned tests, it was observed that the most serious damage to the fuel tank occurs to the tank wall at the point of bullet entrance as well as to the adjacent aircraft structure.

In addition to the initial shock forces during bullet penetration and the pressure field generated by its passage through the liquid fuel, there is a third pressure effect, namely cavity formation, caused by the pressure of the bullet through the liquid fuel. Whereas initial shock waves create the greatest damage at the entrance wall of the fuel tank, the damage caused by cavity formation and collapse have been observed to occur in the proximity of the lateral tank walls and especially at the exit tank wall.

It was discovered during these experiments that all of the afore-described hydraulic pressure effects on the fuel tank caused by the penetration of a bullet can be greatly attenuated by lining the interior walls of the fuel tank with the same rigid, tri-axially reinforced foam of the kind heretofore described for use exteriorily the tank. The foam material in the form of a liner 24 can be attached to the inside wall surface, preferably by bonding with a polyurethane adhesive or the like (see FIGS. 1 and 2). In other words, tests have shown that this same reinforced foam material has an additional property of isolating the tank walls from the destructive force of the shock waves. The pressure loads transmitted to the tank walls will be approximately equal to the dynamic crushing strength of the foam.

Figure 4:
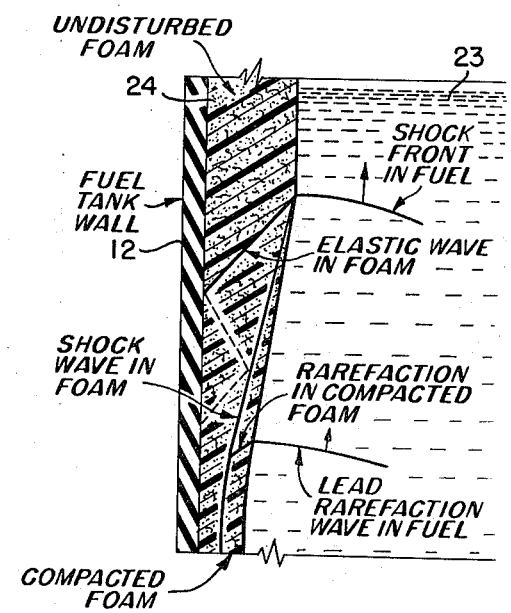
FIG. 4 is a diagrammatic cross-section of a fuel tank showing the details of compression of the foam liner by shock wave phase loads.

FIG. 4 diagrammatically shows the details of the hydraulic compression of the liquid in a fuel tank lined with a layer of the tri-axially reinforced foam 24. This Figure illustrates the shock wave loads near the point of impact of a 45°, conically-nosed 0.50 caliber projectile travelling at 2600 fps, which creates a 17,000 PSI shock followed $8\mu$ sec later by a strong rarefaction wave. It has been determined that the shock velocity in the foam material at the above mentioned pressure is 0.36 mm/$\mu$ sec and the rarefaction wave velocity is 1.5 mm/$\mu$ sec.

The minimum thickness of foam liner 24 required in this example is determined by the time required for the shock in the foam to be overtaken by the rarefaction, and is calculated to be approximately one-eighth inch. Whereas the thickness of the tri-axially reinforced foam material used for an exterior panel 22 is not critical, the use of the foam material as an internal liner 24 affects the volumetric capacity of the fuel tank, and therefore, only that thickness will be employed that will perform the desired shock attenuation under the particular operating conditions to be protected.

Figure 5:
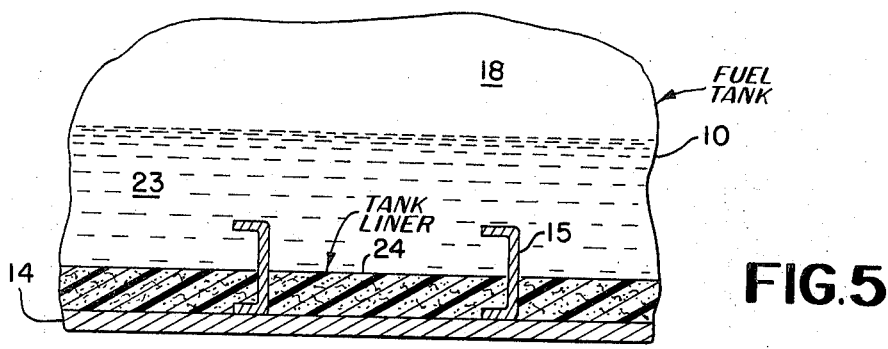
FIG. 5 is a partial cross-section of an integral wing fuel tank not of a self-sealing type showing the use of the novel liner.

Whereas the use of the rigid, tri-axially reinforced foam of the type described is particularly adapted for deployment with self-sealing tanks normally of the fuselage type, it is obvious that this same material advantageously can be used exteriorily or interiorily in non-sealing type of fuel tanks. Thus, FIG. 5 shows the use of attenuating foam material 24 as a liner inside the aircraft skin 14 of an integral wing fuel tank installation. In this use there is no self-sealing material employed in the fuel tank construction.

One test was performed on such an integral wing tank by shooting upward through the bottom of the tank at a 45° angle of incidence with a 0.50 caliber API projectile. Results showed extensive damage of the aluminum skin and supported by rib structures in all cases where no attenuating liner material was used in the manner of this invention. When a three-quarter inch of the tri-axially reinforced foam material was bonded to the inside surface of the bottom wall of the fuel tank in accordance with the teaching of this invention no fracture of the skin was experienced.

In accordance with the teaching of this invention the novel employment of the rigid, tri-axially reinforced foam material have been found to significantly contribute to the reduction of the vulnerability of the aircraft fuel systems. For example, the placing of a layer of the specified foam material on the exterior wall surface of the fuel tank performs the normal function of a backing board to keep the rubber tank wall properly aligned. But even more important the reinforcing fibers in the material, in addition to reducing severe coring and fracturing, was found to wipe off the incendiary material from API bullets prior to entrance into the tank reducing the hazard of internal fire as well as reducing the cauterizing effect on the opening in the self-sealing wall. The broken strands of the reinforcing fibers tend to bridge the bullet opening and assist in the resealing action.

When a layer of the rigid tri-axially reinforced foam was used as a liner within the tank of the self-sealing and non-sealing types, it had the properties of absorbing the shock wave energy caused by the hydraulic ram pressures, minimizing the damage to the tank and surrounding aircraft structure.

Obviously many modifications and variations of the present invention are possible in the light of the above teachings. It is therefore to be understood that within the scope of the appended claims the invention may be practiced otherwise than as specifically described.

What is claimed is:

1. An aircraft fuel tank subject to penetration by a projectile comprising:
   a fuel tank having walls constructed of self-sealing material;
   a shock attenuating layer secured to the inner wall surfaces;
   said layer being made of a rigid, crushable, closed cell foam material of at least 1/8 inch thickness reinforced with nylon fibers along three axes,
   whereby impact damage by the projectile to the tank walls is minimized by said layer absorbing the shock waves created by the penetrating projectile within the fuel tank.

2. An aircraft fuel tank subject to penetration by a projectile comprising:
   a fuel tank having walls made of a self-sealing material;
   a shock attenuating layer of material secured contiguous to the inside wall surfaces forming a thin liner therefore;
   a second layer of material disposed contiguous to the outside wall surfaces;
   said layers of material being made of a crushable, closed cell foam material reinforced with nylon fibers along three axes;
   whereby said fibers in the outer layer of foams function to wipe the incendiary from the projectile before it enters the tank and facilitate resealing of the walls, and said inner layer of foam material absorbs the shock wave created by the projectile within the tank to minimize impact damage to the tank walls.

* * * * *